Jan. 17, 1939.  M. G. CHANDLER  2,143,936
FUEL FEEDING MEANS FOR INTERNAL COMBUSTION ENGINES
Original Filed May 14, 1934  7 Sheets-Sheet 1

Inventor
M. G. CHANDLER
By Pattison Wright & Pattison
Attorneys

Jan. 17, 1939.　　　M. G. CHANDLER　　　2,143,936
FUEL FEEDING MEANS FOR INTERNAL COMBUSTION ENGINES
Original Filed May 14, 1934　　7 Sheets-Sheet 5

Inventor
M. G. CHANDLER

By
Pattison Wright Pattison Attorneys

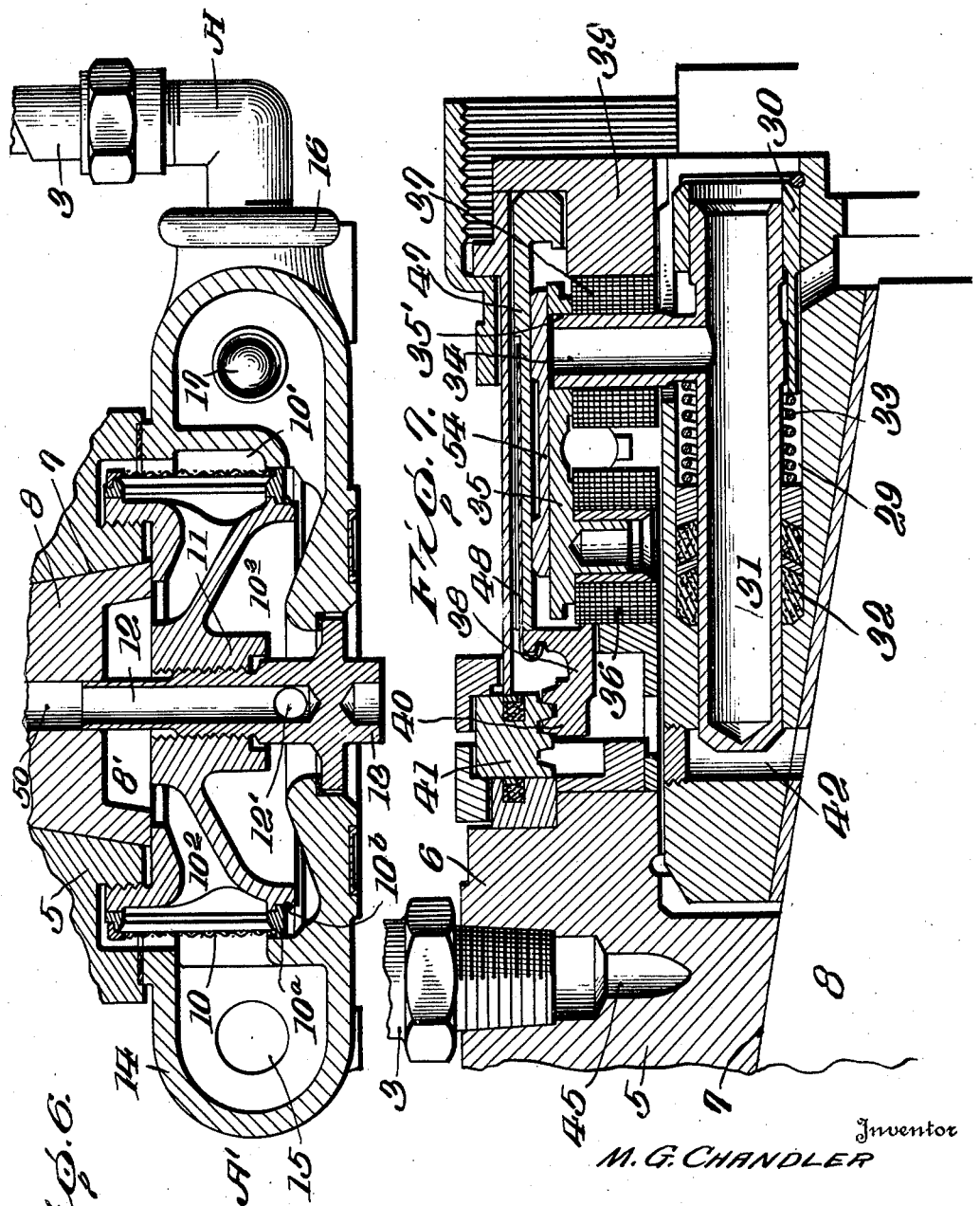

Jan. 17, 1939.   M. G. CHANDLER   2,143,936
FUEL FEEDING MEANS FOR INTERNAL COMBUSTION ENGINES
Original Filed May 14, 1934   7 Sheets-Sheet 7
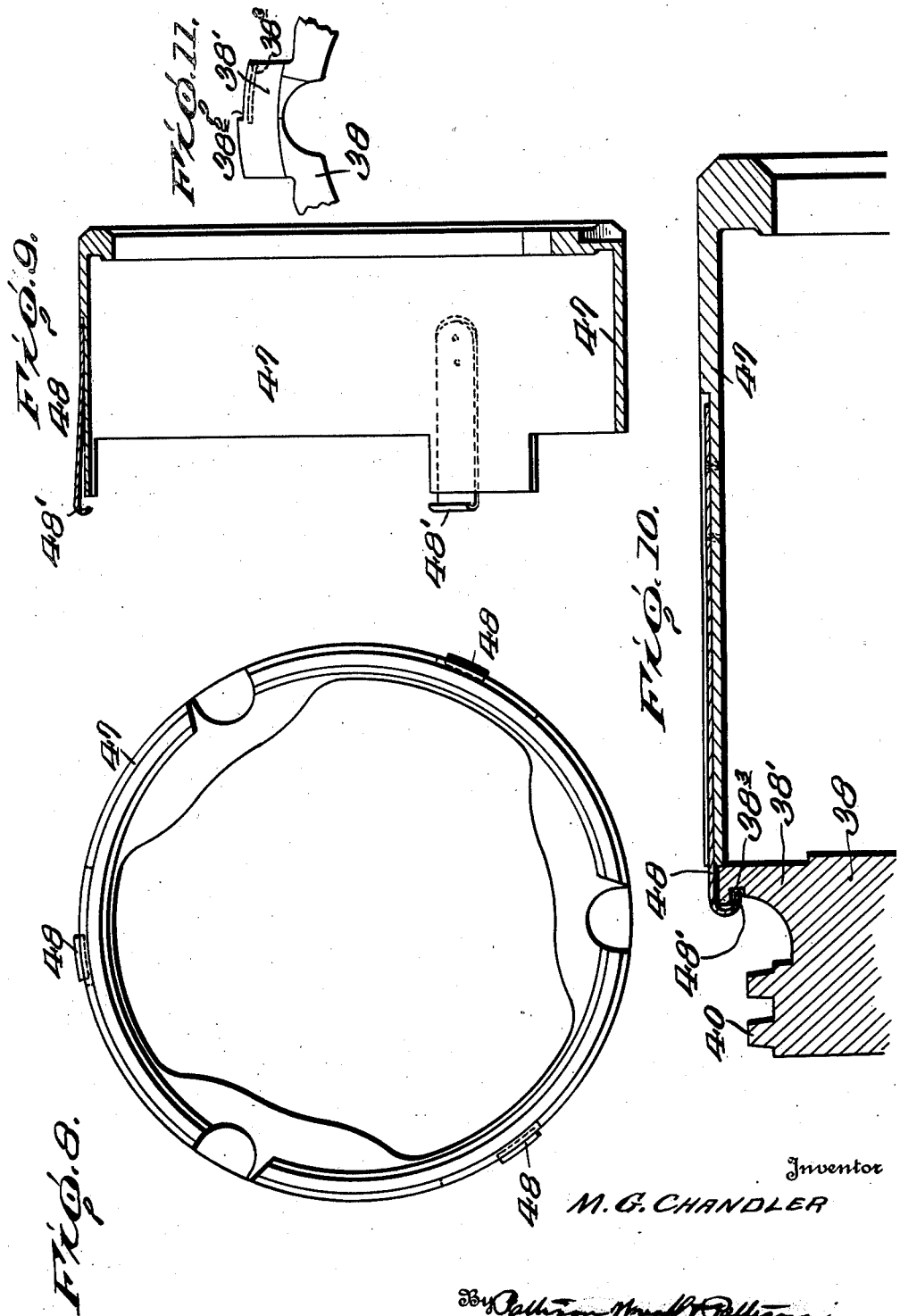
Inventor
M. G. CHANDLER
Attorneys Patented Jan. 17, 1939

2,143,936

UNITED STATES PATENT OFFICE 2,143,936

FUEL FEEDING MEANS FOR INTERNAL COMBUSTION ENGINES

Milford G. Chandler, Flint, Mich., assignor, by mesne assignments, to Borg-Warner Corporation, Chicago, Ill., a corporation of Illinois Application May 14, 1934, Serial No. 725,667
Renewed June 23, 1938

15 Claims. (Cl. 103—162)

This invention relates to certain new and useful improvements in fuel feeding means for internal combustion engines and is an improvement on my application filed July 5, 1928, Serial Number 290,492, since issued as Patent No. 2,022,653, bearing date of December 3, 1935, and is a companion application of applications Serial Nos. 725,665 and 725,666 filed even date herewith.

The main object of this invention is to provide a fuel feeding means for internal combustion engines employing a pump with a circulatory system for the fuel delivered thereto having means for delivering directly into the intake ports of the pump the fuel from the circulatory system whereby a circulation of fuel within the central portion of the pump is obtained so as to prevent the accumulation of vapor and to reduce the heat as the heat is carried off by the fluid passing through the pump.

This construction provides means for cooling the pump as well as to prevent the formation of vapor and is of particular advantage when used under certain atmospheric conditions and when very volatile fuels are employed for forming the fuel charges for the internal combustion engine to which the fuel feeding system is attached.

By constructing the fuel feeding system in this manner, an active flow of fuel passes each individual port whereby all vapor or bubbles which might accumulate are carried off by the flow of the fluid back into the fuel reservoir.

Another object of my invention is to provide a new type of anchorage for the intake over-travel sleeve to the intake cam in order to eliminate the use of springs as it has been found with previous constructions of pumps that there is a tendency for the cam nut which constitutes the control to creep towards a positive or no delivery position and the amount of power required to actuate the control is beyond the permissible limits.

A still further object of the invention is to provide a construction in which several of the parts are simplified and a very compact pump is produced forming a part of the fuel feeding system for the internal combustion engine wherein accurate measured charges can be delivered to the air intake of the engine, which charges operate in unison with air controlling means so that the proper proportion of fuel to air is maintained.

In my two companion applications Serial Nos. 725,665 and 725,666, filed even date herewith, I have disclosed a fuel measuring pump used in connection with a fuel feeding system, in one of which fuel is fed to the pump by an auxiliary pump and the other discloses fuel fed by an auxiliary pump so as to cause the fluid to circulate through the strainer, while with my improved construction as herein shown, the fuel enters the strainer and passes into the cone of the pump by the intake ports and then out so as to cool the pump and to carry the vapor away from the intake ports, thereby overcoming the difficulties existing with prior constructions of pumps.

Other and further objects and advantages of the invention will be hereinafter set forth and the novel features thereof defined by the appended claims.

In the drawings—

Figure 6 is a section taken on line 6—6 of Figure 2;

Figure 7 is a detail enlarged view showing the manner of connecting the large over-travel sleeve to the intake cam;

Figure 8 is an end view of the over-travel sleeve;

Figure 9 is a vertical section through the same;

Figure 10 is an enlarged section showing the spring raised in dotted lines in order to disconnect the over-travel sleeve from the intake cam; and Figure 11 is a detail view of a portion of the intake cam showing the groove of the lug in dotted lines in which the spring hook is seated in order to connect the over-travel sleeve to the intake cam.

Figure 1:
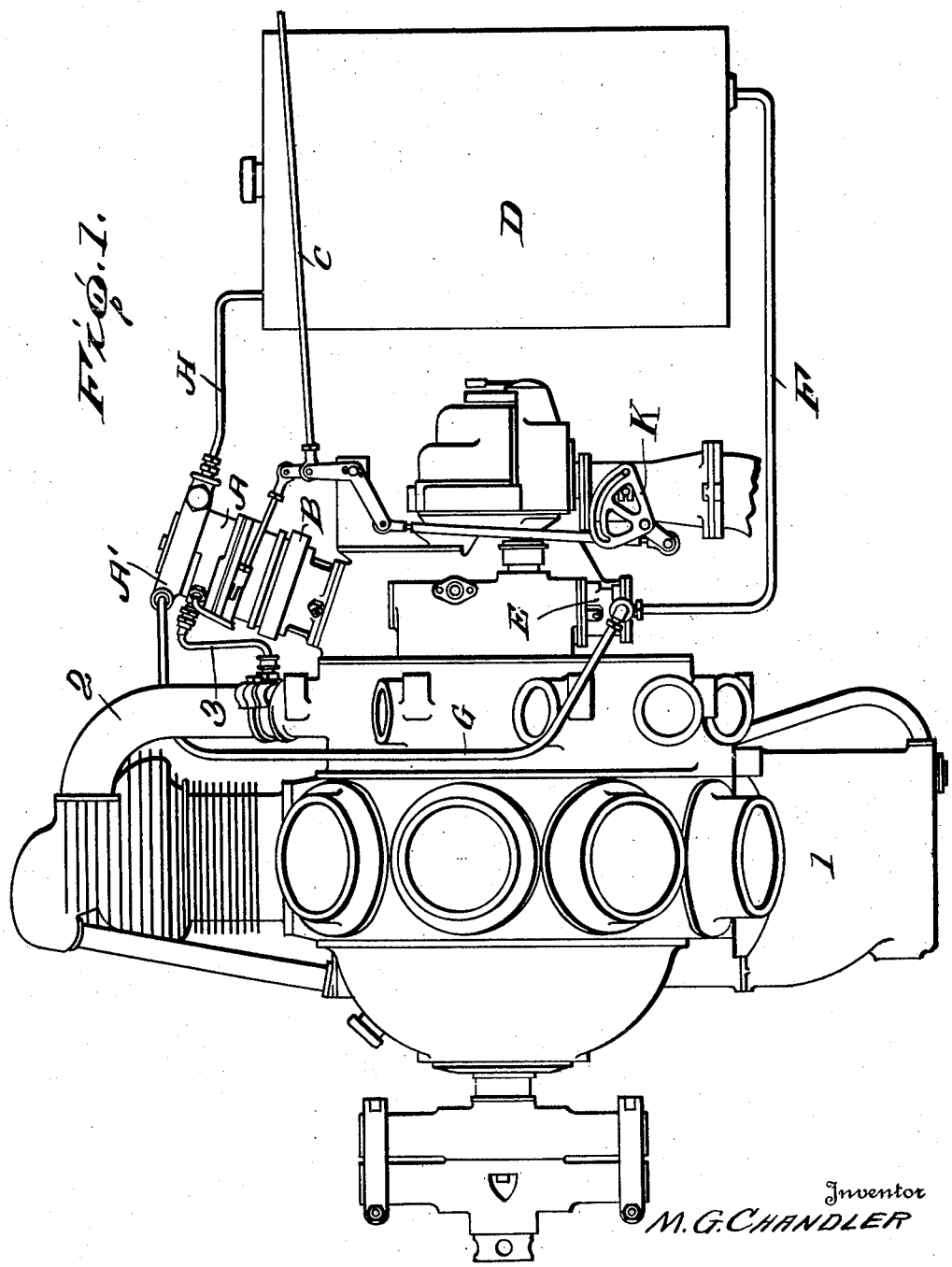
Figure 1 is a side elevation of an internal combustion engine showing the application of my improved construction of fuel feeding means thereto.

In the drawings 1 indicates an internal combustion engine provided with a plurality of air intakes 2, each of which is provided with a fuel feeding pipe 3 which terminates in a nozzle disposed therein (not shown), said pipe extending from a measuring pump A carried by a reduction gear assembly B of any suitable construction such as clearly shown in the companion applications Serial Nos. 725,665 and 725,666, filed even date herewith, whereby the measuring pump will be driven and timed by the engine so as to deliver measured charges of fuel to the air intake at the proper time.

The pump A is provided with means for varying the stroke of the pistons, which means is connected to control rod C, to which is also connected the air controlling means K whereby I am able to properly control the proportion of fuel to air.

A suitable reservoir D supplies fuel to a pump E through a pipe F and said pump has an outlet to which a pipe G is connected, which supplies fuel to the strainer A' of the pump A, which strainer is provided with an outlet pipe H extending to the reservoir D whereby when the engine is in operation and the pump E is driven by the engine, liquid fuel will be circulated through the pump A so as to keep it cool and to carry away vapor and bubbles.

In the drawings I have shown a pump for delivering measured charges of fuel to the respective cylinders of the engine constructed substantially the same as disclosed in the two companion applications Serial Nos. 725,665 and 725,666, filed even date herewith with the exception of the construction of the cone to allow fuel to circulate by the inlet ports and the construction of the large over-travel sleeve which is connected to the intake cam to dispense with the use of a spring and in view of the disclosure of these two applications, the construction of the pump with the exception of these two features, will be described broadly only.

The pump comprises a casing 5 provided with a head 6 having a frusto-conical seat 7 in which is seated a cone 8 locked therein by the strainer A'.

The strainer A' comprises a strainer body 9 carrying a circular strainer 10 having a central internally threaded hub portion 11 into which extends an externally threaded tubular portion 12 of a locking member 13, which engages the strainer cap 14 so as to clamp it against the end of the head between which a packing is arranged as clearly shown, whereby the complete strainer is formed which is provided with an inlet 15 to which is connected the pipe G and an outlet 16 to which is connected the pipe H, a suitable relief valve 17 being disposed adjacent the outlet through which the fluid passes for maintaining the fluid under a predetermined pressure within the strainer.

Figure 2:
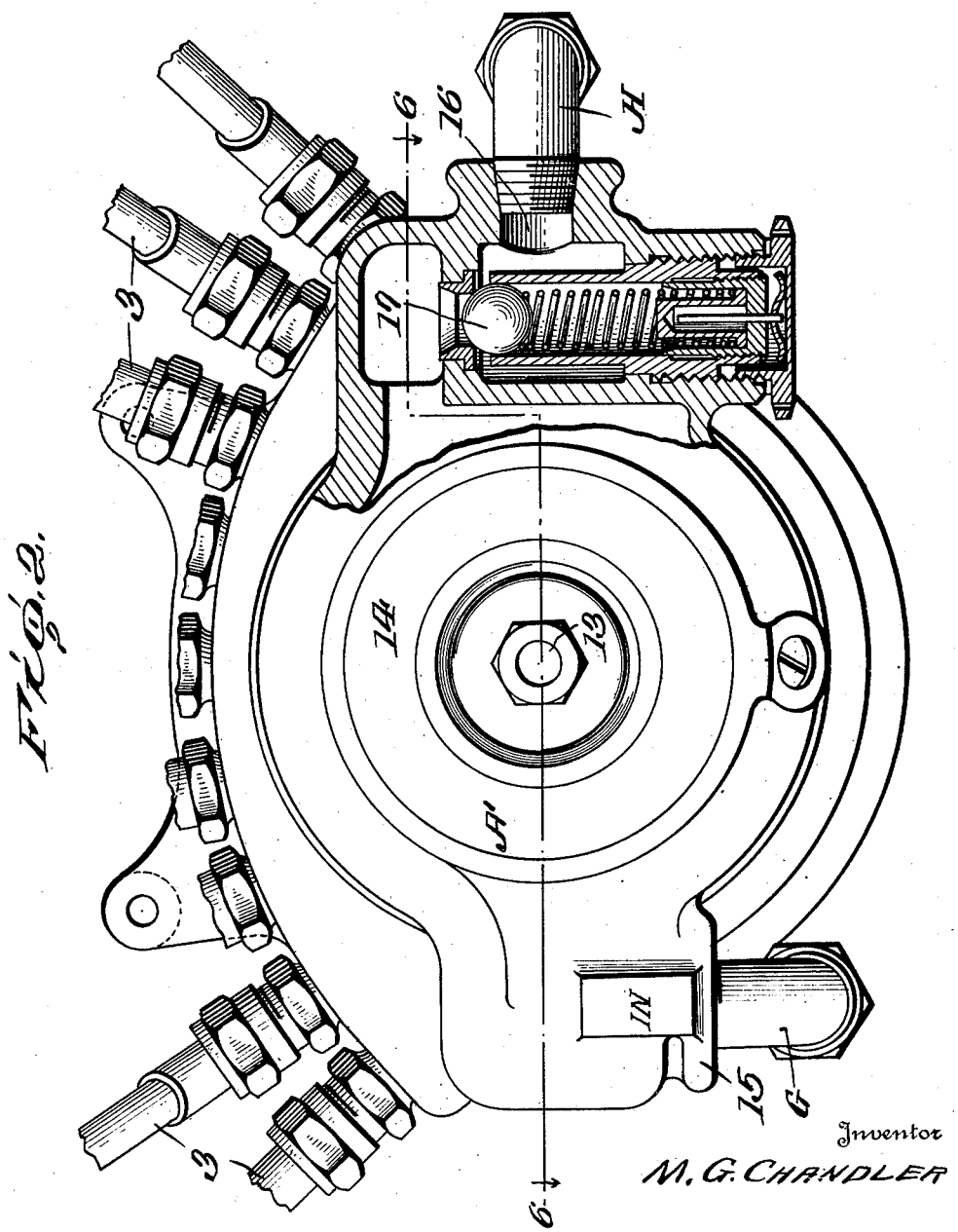
Figure 2 is an end elevation of a pump partly broken away showing the relief valve for maintaining a predetermined pressure within the fuel circulatory system.
Figure 3:
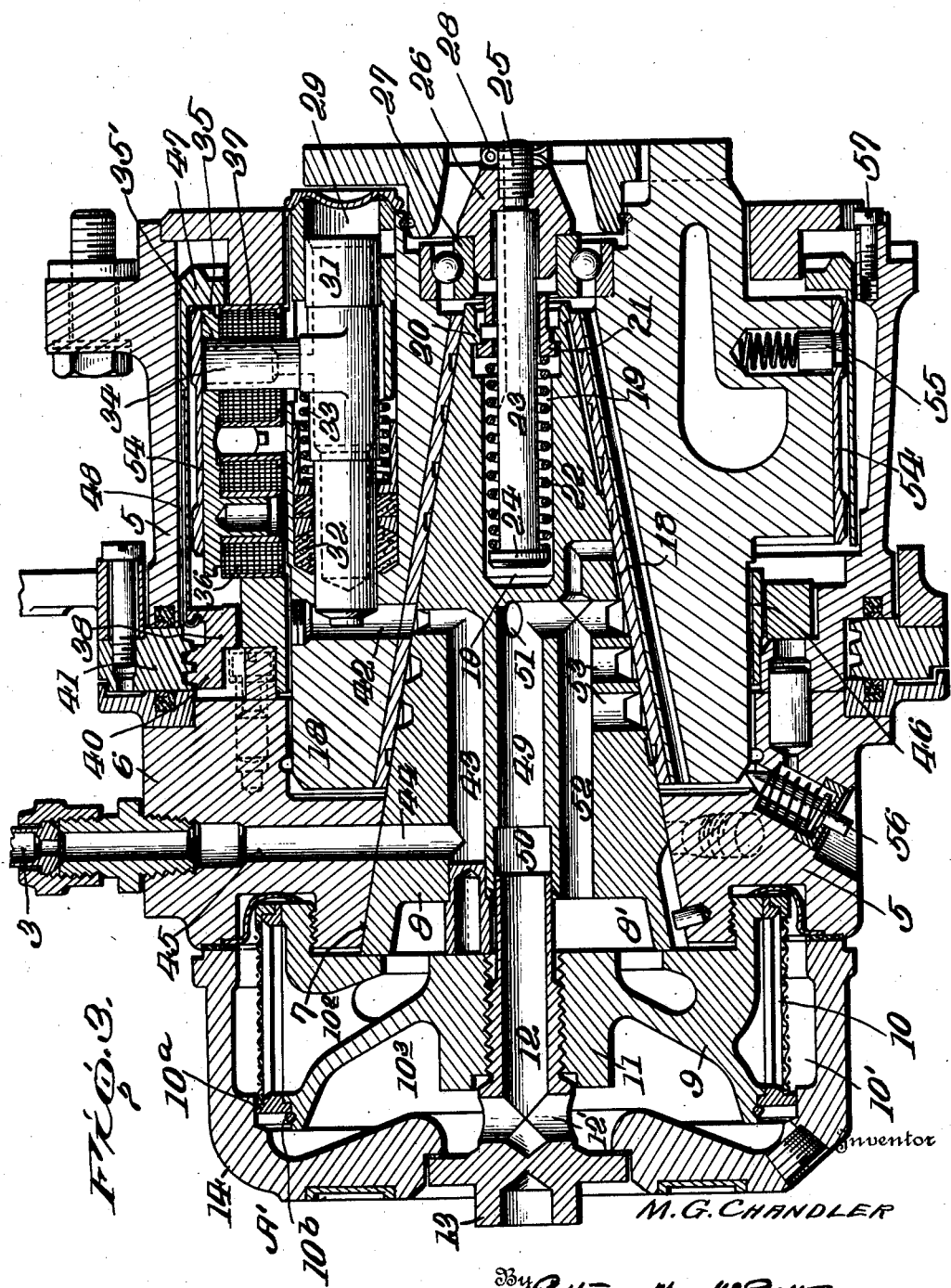
Figure 3 is a longitudinal section through the pump.
Figure 4:
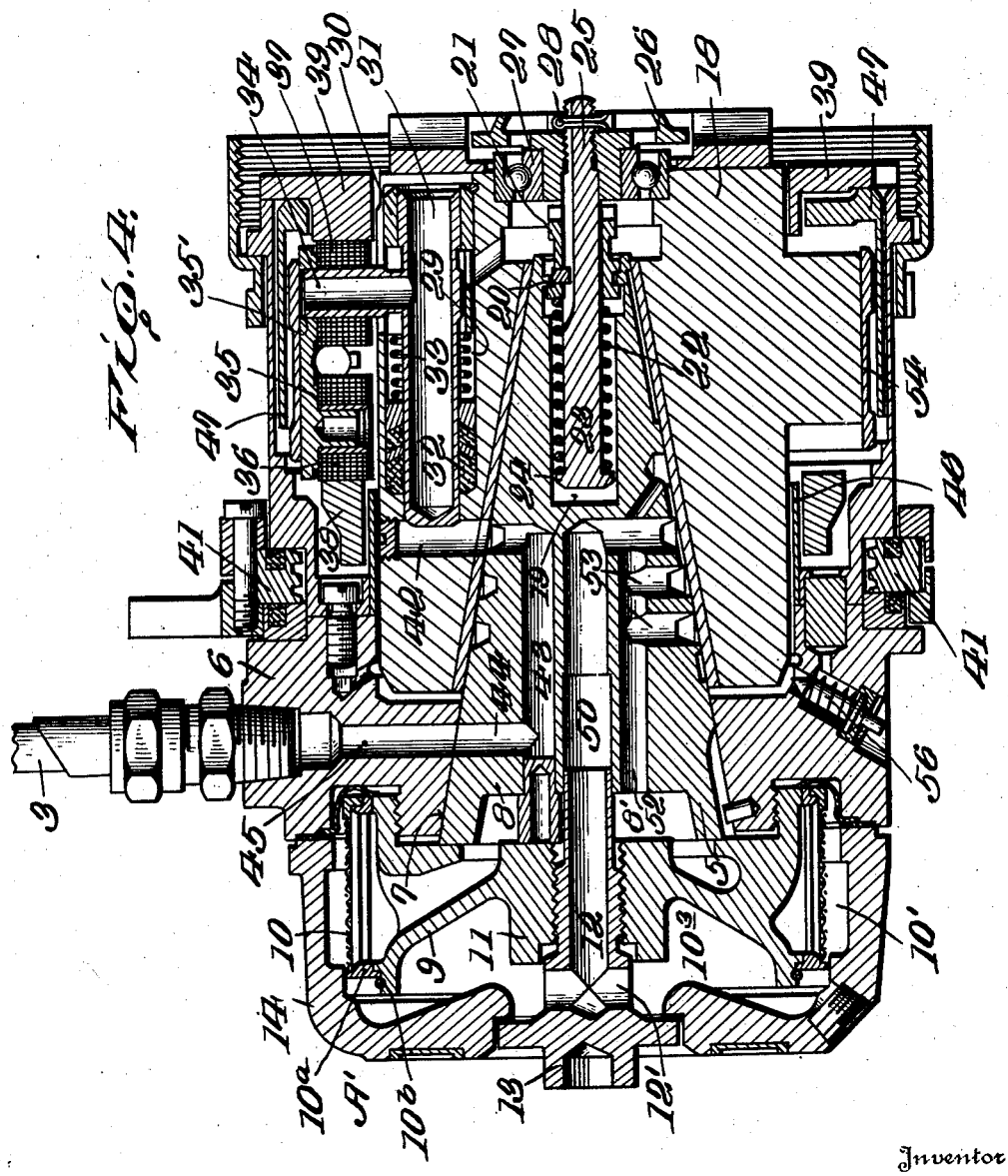
Figure 4 is a similar view taken at an angle to Figure 3.
Figure 5:
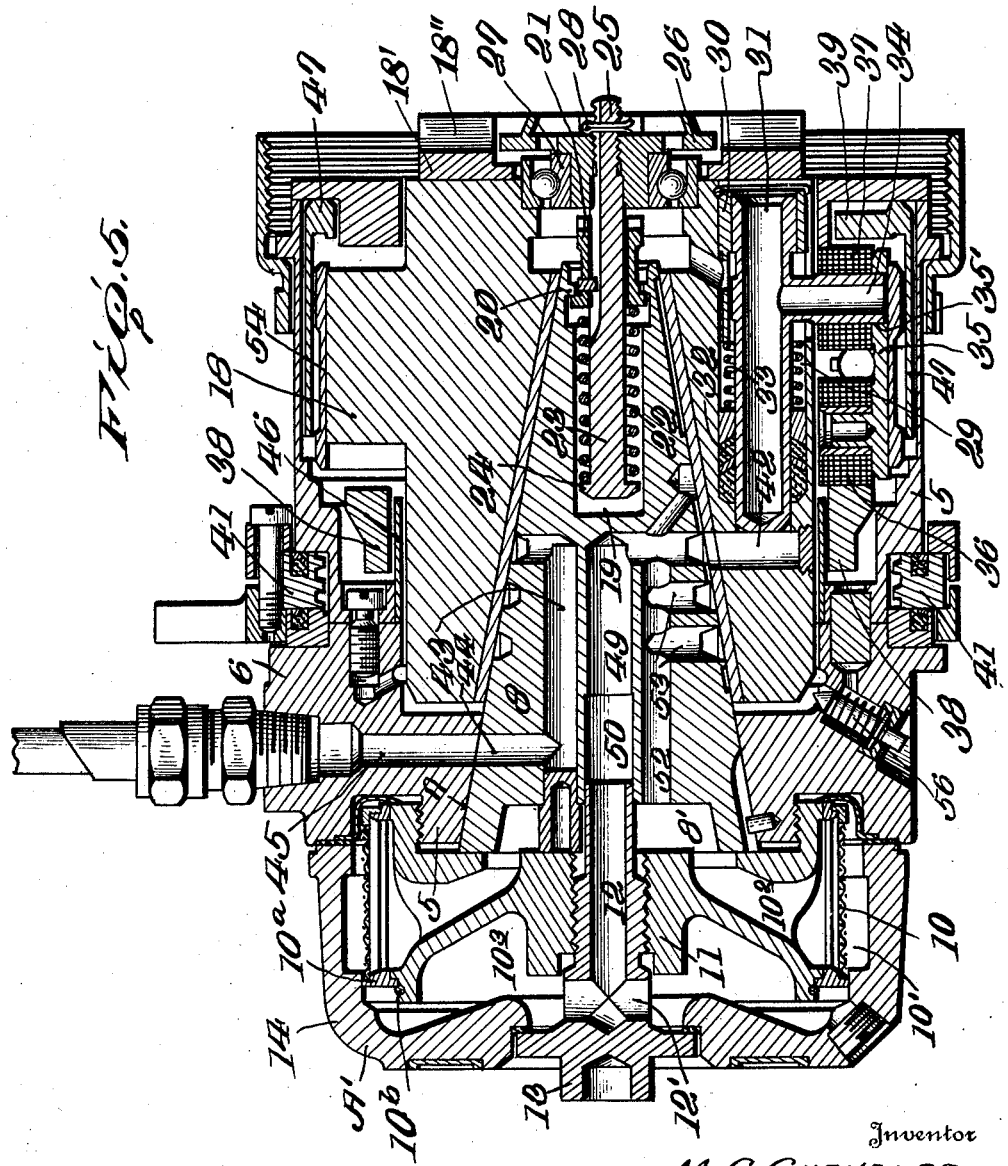
Figure 5 is a longitudinal section taken at another angle.

The relief valve is constructed so that it can be adjusted as clearly shown in Figure 2 and while I have shown a particular construction of relief valve, I do not wish to limit myself to the use of any particular construction as the object of the relief valve is to build up and maintain a predetermined pressure of fluid within the strainer cap or within the circulatory system employed for supplying fuel to the measuring pump.

This produces a construction having an annular chamber 10' divided by a circular strainer 10 to thoroughly strain the fuel passing therethrough, which fuel passes through the passages 10² into the chamber 8' of the cone. The body 9 produces a chamber 10³ which communicates with the outlet ports of the member 12, the chamber 10' being provided with an inlet 15 and the chamber 10³ with the outlet 16.

The circular strainer 10 is carried by a circular frame 10ª locked in position by a snap ring 10ᵇ which allows the strainer to be detached when the cap 14 is removed without disturbing the body 9, which construction is similar to that shown in my companion applications executed even date herewith. This provides means for removing the strainer for cleaning the same without disturbing the position of the parts of the combined pump and distributor.

Mounted on the cone 8 is a rotor 18 provided with a conical socket 18¹ to receive the cone, said cone being provided with a longitudinally disposed bore 19 having an annular flange 20, which is notched to receive a similar shaped head of a sleeve 21 in order to form a bayonet lock between the sleeve and the cone, said sleeve engaging one end of a coil spring 22 surrounding a stud 23 provided with a head 24, which engages the other end of the spring and produces tension so as to draw the cone and rotor together, the stud having a threaded portion 25 on which is mounted a head member 26 which engages a bearing 27, which holds the rotor in engagement with the cone, and after the rotor has been placed in position, the head is adjusted to increase the tension and is locked by a cotter pin 28, the broad means for accomplishing this result to enable the parts to be assembled without the means of a power press is disclosed in my companion application Serial No. 725,666, filed even date herewith.

The rotor 18 may be driven in any suitable manner. Herein it is shown driven and timed by the engine through the reduction gear assembly B, shown in Fig. 1, the specific construction of which forms no part of this invention. To that end the rotor has fixed thereon against relative rotation a clutch member 18' formed with recesses 18" for the reception of teeth of a complementary clutch member driven by the reduction gear assembly B.

Formed longitudinally within the rotor is a series of bores 29 in which are plunger guide sleeves 30 in which plungers 31 are mounted surrounded by a packing 32 held in its proper position by a coil spring 33, the other end of which engages the guide sleeve 30, and these plungers are provided with driving projections 34 herein shown tubular in shape which extend into roller guide shoes 35, said shoes being provided with rollers 36 and 37 which engage the intake and exhaust cams 38 and 39, said intake cam being provided with toothed lugs 40 which are engaged by threads formed on adjusting nut 41 so that the cam can be axially adjusted in order to vary the stroke of the plunger, all of which is clearly described in my companion application Serial No. 725,665, filed even date herewith.

This provides means for reciprocating the plungers as the rotor revolves as the cams are non-rotating cams and in the drawings I have shown the plungers so mounted that they discharge into radial bores 42 which are adapted to communicate with longitudinal bores 43 formed in the cone 8, which bores at their outer ends are provided with lateral outlets 44 adapted to communicate with radial passages 45 formed in the head to which are connected the fuel pipes 3 leading to the respective cylinders of the engine, whereby fuel under pressure will be forced to the respective cylinders of the engine as the rotor revolves.

The roller guide shoe 35 is provided with an opening 35' into which extends the tubular driving projection 34 of the plunger 31 in order to form a driving connection between the shoe and plungers, the tubular projection forming a bearing shaft for the roller 37 whereby I am able to provide a plunger with a driving projection which will withstand the strain to which it is subjected.

The movement of the rollers on the cams are controlled by an inner over-travel sleeve 46 and an outer over-travel sleeve 47, the construction of said outer over-travel sleeve being clearly shown in Figures 8, 9 and 10. The outer over-travel sleeve carries a spring hook 48 which engages the intake cam 38 and connects it directly thereto, which eliminates the springs as used in my companion application and prevents the tendency of the cam nut to creep. This construction of over-travel sleeve causes the force required to accelerate and decelerate the plungers to cancel each other out, as it will be found that the force required to stop the plungers very nearly equals the force required to start them, and by connecting the parts which resist these two forces, which were opposite in direction, the tendency to creep is eliminated.

The spring hook 48 is preferably welded within a recess formed in the periphery of the over-travel sleeve 47 as clearly shown in Figures 9 and 10 and this hook is provided with a hooked end 48' for connecting the same to the intake cam. The intake cam is provided with a lug 38' reduced as shown at 38² and each lug is provided with a groove 38³ into which the hooked end 48' of the spring hook 48 of the over-travel sleeve 47 is adapted to be moved by oscillating the over-travel sleeve 47 so as to connect the over-travel sleeve 47 to the intake cam in such a manner that it can be readily connected or disconnected and yet will remain in a connected position. It is only necessary to oscillate the over-travel sleeve in respect to the intake cam in order to allow the hooked end 48' to move into the groove 38³ so as to lock the same therein.

The cone 8 is provided with a central axial bore 49 which is enlarged at 50 into which the end of the tubular member 12 extends, said tubular member 12 being provided with lateral outlet ports 12'. The passage 49 registers with lateral passages 51 which in turn register with longitudinal bores 52 provided with lateral intake ports 53 which are adapted to register intermittently with the bores 42 of the pumps so that fuel which passes through the strainer from the intake of the strainer will pass through the somewhat U-shaped passage formed by the bores 52, and the lateral bores 51, the axial bore 49, thus flowing past the intake ports 53 and into the tubular member 12 and out the lateral outlets 12'. In this manner the fuel will circulate past the intake ports of the pump cylinders in quantities greater than those handled by the pump so as to carry off the heat and prevent the formation of vapor and bubbles as this is likewise carried off by the circulation of the fluid past the intake ports, and in connection with the relief valve wherein pressure is built up, positive means is produced for circulating and maintaining fluid in the intake ports under pressure so that measured charges will be drawn in by the pump plungers and delivered to the respective cylinders of the engine.

In the construction of pump cylinder as herein shown, the displacement takes place in the lateral passages 42 which constitute the pump cylinders or barrels. The rotor is provided preferably with guideways in which the roller shoes are slidably mounted, over which is arranged a rotor band 54 secured in place by a spring plug 55. The pump is also provided with a timing device comprising a spring pressed plunger 56 mounted in the casing 5 and adapted when pressed inwardly while the rotor is being revolved slowly, to engage a V-slot formed in the rotor. When the plunger engages the V-slot the operating parts of the pump and distributor are in position to start injection to cylinder one of the engine to which the pump is attached thereby facilitating timing of the pump with respect to the engine. The exhaust cam is held in its proper position by retaining screw 57.

The fuel feeding means disclosed in this application is intended to be used in connection with an internal combustion engine of the spark ignition type and comprises a fuel feeding system employing a combined pump and distributor driven and timed by the engine for injecting measured charges of liquid fuel into the air intake of the cylinder with means for simultaneously controlling the measured charges of fuel with the air taken in the cylinders of the engine, and while I have not shown the nozzles for spraying the fuel, I wish it to be clearly understood that my system of fuel injection employs means for placing fuel under pressure and injecting said fuel from a nozzle for reducing the fuel to a fine spray whereby an explosive mixture can be produced in which the mixture ratio is controlled throughout the various ranges of speed and load.

In the construction of pump herein shown, the cone is provided with a substantially U-shaped passage, from one of the legs of which extend intake ports, whereby fuel can be circulated through the cone directly past the intake ports in order to keep the cone cool and to carry off vapor and bubbles.

While in the drawings I have shown and in the specification I have described a fuel feeding means for an internal combustion engine of the spark ignition type, I do not wish to limit myself to the use of my fuel feeding means in connection with any particular type of engine.

In the operation of a pump constructed in accordance with my invention as disclosed in this application, I employ an auxiliary pump driven by the engine to provide a circulatory system supplying fuel to the metering pump. The metering pump is driven and timed by the engine through the medium of driving gear assembly as clearly shown, and as the rotor revolves, the pistons are reciprocated and at the same time the auxiliary pump circulates fuel directly past the intake ports of the cylinders of the measuring pump, which not only prevents the accumulation of vapor but reduces the heat and has certain advantages when used under certain atmospheric conditions and also when used with very volatile fuels.

This construction provides means for passing the fuel past each individual port whereby all the vapor bubbles which accumulate are carried off by the flow back to the main fuel supply.

As the rotor revolves, the measuring pumping units are reciprocated through fixed and movable non-rotatable cams, the movable cam being operated by means which are connected to an air control means whereby the proper proportion of fuel to air is maintained.

By anchoring the intake over travel sleeve to the intake cam, the use of springs is eliminated and the tendency of the cam controlling means to creep towards the position of no delivery is eliminated by causing the forces required to accelerate and decelerate the plungers and rollers to cancel each other out, as it has been found that the force required to stop the plungers very nearly equals the force required to start them and by connecting the parts which resist these forces which are in opposite direction, the tendency to creep is eliminated to a point where it is easily controlled.

This construction of pump when connected to a multiple cylinder internal combustion engine delivers measured charges of fuel to the respective cylinders, which charges are in proportion to the amount of air fed to the cylinders whereby an explosive mixture will be delivered to the respective cylinders of the engine consisting of fuel and air thoroughly mixed as the fuel is delivered through a self-loaded valve controlled nozzle so as to finely spray the fuel in the path of air being forced or drawn into the respective cylinders of the engine.

In the drawings I have illustrated the application of my improved construction of combined pump and distributor used in connection with an auxiliary pump and a super-charger, but I wish it to be clearly understood that I do not wish to limit myself to the use of either of these devices as my improved construction of measuring pump and distributor will operate without either of these devices.

Application Serial No. 290,492, filed July 5, 1928, since issued as Patent No. 2,022,653, bearing date of December 3, 1935, contains claims directed more broadly to the means for reciprocating the plungers, the means for varying the stroke of the plungers, and means for preventing over-travel. Said application also contains claims directed to the arrangement of the ports in the conical stationary member and the rotor, as well as the means for holding the rotor resiliently on the stationary conical member. Application Serial No. 725,665 contains claims directed to the double roller construction for actuating the plungers and means for preventing over-travel of the plunger in both directions, and the means for mounting the rotor on the conical stationary member. Application Serial No. 725,666 contains claims on the means for detachably securing the rotor to the conical stationary member and the means for tensioning the rotor.

What I claim is:

1. A fuel feeding system for internal combustion engines comprising a combined pump and distributor, said pump comprising a rotor provided with a plurality of pumping units, said distributor comprising a stationary member provided with a U-shaped passage, having intake ports in communication with said pumping units, means for resiliently holding said rotor on said stationary member and means for circulating fuel through said U-shaped passage.

2. A fuel feeding means for internal combustion engines comprising a pump and distributor, said pump comprising a rotor provided with a reciprocating piston, said distributor comprising a stationary member provided with a substantially U-shaped passage, a series of intake ports in communication with said U-shaped passage, said members having contacting surfaces inclined to the axis of said members, means for resiliently holding said members together and means for circulating fuel through said U-shaped passage.

3. A fuel feeding means for internal combustion engines comprising a combined pump and distributor, said pump comprising a rotor, provided with a reciprocating piston, said distributor comprising a stationary member with a substantially U-shaped passage having a series of intake ports in communication therewith, said members having contacting surfaces inclined to the axis of said members, means for resiliently holding said members together, and means for circulating fluid through said U-shaped passage.

4. A fuel feeding means for internal combustion engines comprising a combined pump and distributor, said pump comprising a rotor having a plurality of reciprocating pumping units, a distributor comprising a stationary member provided with a U-shaped fuel passage having a series of intake ports adapted to intermittently communicate with said pumping units, said members having contacting surfaces inclined to the axis of said members, means for resiliently holding said members together and an auxiliary pump for circulating fuel through the U-shaped passage of said stationary member.

5. In a fuel feeding system for internal combustion engines, a combined pump and distributor for feeding fuel to the cylinders of the engine, said pump comprising a rotary member and a stationary member, said rotary member being provided with reciprocating pumping pistons and said stationary member being provided with a substantially U-shaped fuel passage adapted to intermittently be brought into communication with the cylinders of the reciprocating pistons and an auxiliary pump for circulating fuel through said U-shaped passage.

6. In a fuel feeding system for internal combustion engines, a combined pump and distributor for feeding measured charges of fuel to the respective cylinders of the engine, said pump having a stationary member surrounded by a rotary member, said stationary member being provided with a U-shaped fuel passage in communication with the intake ports and an auxiliary pump for circulating fuel through said U-shaped passage directly by the intake ports.

7. In a fuel feeding means of the kind described, a combined pump and distributor for feeding fuel to the cylinders of an engine, said pump comprising a rotary member having a plurality of reciprocating pistons, said distributor comprising a stationary member with a substantially U-shaped fuel passage and a series of intake ports, said members having contacting surfaces inclined to the axis of said members, means for resiliently holding said members together and an auxiliary pump for circulating fuel through said U-shaped passage.

8. A combined fuel pump and distributor for feeding fuel to an internal combustion engine, comprising a stationary cone provided with a U-shaped fuel passage, a rotor having a conical socket revolubly mounted upon said cone, said rotor being provided with rotary pumping cylinders, said fuel passage being provided with intake ports adapted to intermittently register with said pumping cylinders, plungers working transversely in said pumping cylinders, means for reciprocating the plungers as the rotor revolves, a strainer carried by the stationary member having inlet and outlet ports registering respectively with the legs of the U-shaped fuel passage, said strainer being provided with a relief valve and an auxiliary pump for circulating fuel through said strainer.

9. A fuel feeding system for internal combustion engines comprising a combined pump and distributor, said pump comprising a rotor provided with a plurality of pumping units, said distributor comprising a stationary member provided with a continuous fuel supply and return passage having intake ports in communication with said pumping units, and means for circulating fuel through said continuous passage.

10. A combined fuel pump and distributor for feeding fuel to an internal combustion engine comprising a stationary member provided with a continuous fuel passage, a rotor revolubly mounted upon said member, said rotor being provided with pump cylinders, said fuel passage being provided with intake ports adapted intermittently to register with said pump cylinders, plungers working in said pump cylinders, means for reciprocating the plungers as the rotor revolves, a strainer carried by the stationary member having inlet and outlet ports registering respectively with the ends of the fuel passage in said member, said strainer being provided with a relief valve, and an auxiliary pump for circulating fuel through said strainer.

11. A combined pump and distributor for feeding fuel to an internal combustion engine comprising a stationary casing having a conical seat, a stationary cone fitting at its base in said seat and having a continuous fuel passage, a rotor having a conical socket revolubly mounted upon said cone, said rotor being provided with pump cylinders, said fuel passage being provided with intake ports adapted intermittently to register with said pump cylinders, plungers working in said pump cylinders, means for reciprocating the plungers as the rotor revolves, an annular member threaded into said casing and engaging said cone to secure the same in said seat, a strainer removably carried by said annular member, and a cap enclosing said strainer.

12. A fuel feeding and measuring device for an internal combustion engine comprising a member having a plurality of pumping units carried thereby, each of said units having an intake and an exhaust port, a distributor member having intake and exhaust ports for communication respectively with the intake and exhaust ports of said pumping units, said members being relatively rotatable, and a passage in said distributor communicating intermediate its ends with the intake ports of the distributor, said passage having a port for the supply of fuel to the distributor and a port for the discharge from the distributor of fuel supplied to the passage in excess of the requirements of the pumping units.

13. A fuel feeding and measuring device for an internal combustion engine comprising a member having a plurality of pumping units carried thereby, each of said units having an intake and an exhaust port, a distributor member having intake and exhaust ports for communication respectively with the intake and exhaust ports of said pumping units, said members being relatively rotatable, a passage in said distributor communicating only with the intake ports thereof and having a port for the supply of fuel to the distributor and a port for the discharge of fuel from the distributor, and means for circulating fuel through said passage and in quantities in excess of those handled by the pumping units.

14. In a fuel feeding means of the kind described, a combined pump and distributor for feeding fuel to the cylinders of an engine, said pump comprising a plurality of cylinders each having a piston reciprocable therein, said distributor having a passage therein formed with a port for the supply of fuel to the distributor and a port for the discharge of fuel from the distributor, a plurality of exhaust ports blocked against communication with the passage and a plurality of intake ports communicating with the passage intermediate the supply and discharge ports thereof, said exhaust and intake ports being adapted alternately to communicate with the pump cylinders, and means for circulating fuel under pressure through the passage in the distributor and in quantities in excess of those handled by the pump.

15. A fuel feeding and measuring device for an internal combustion engine comprising a member having a plurality of pumping units carried thereby, a distributor member having an intake and an exhaust port, said members being relatively rotatable to effect alternate communication of said intake and said exhaust port with a pumping unit, and a passage in said distributor communicating only with said intake port intermediate the ends of the passage, said passage having a port for the supply of fuel to the distributor and a port for the discharge from the distributor of fuel supplied to the passage in excess of the requirements of the pumping units.

MILFORD G. CHANDLER.